US005241483A

United States Patent [19]

Porret et al.

[11] Patent Number: 5,241,483

[45] Date of Patent: Aug. 31, 1993

[54] METHOD AND APPARATUS FOR CHECKING PRINTING AND CUTTING QUALITY IN A PACKAGE PRODUCING INSTALLATION

[75] Inventors: Olivier Porret, Lausanne; Roger Roch, Cossonay-Ville, both of Switzerland

[73] Assignee: Bobst S.A., Switzerland

[21] Appl. No.: 687,241

[22] Filed: Apr. 18, 1991

[30] Foreign Application Priority Data

Apr. 18, 1990 [CH] Switzerland ........................ 01301/90

[51] Int. Cl.[5] ................................................ G06F 15/46

[52] U.S. Cl. .......................................... 364/469; 83/74; 83/76.4; 83/371; 226/28; 364/474.09

[58] Field of Search ................ 364/469, 468, 471, 507, 364/550, 551.01, 551.02, 559, 474.09; 83/74, 76.4, 365, 367, 371; 101/181, 485, 486; 226/2, 3, 27-31; 250/555-557, 548, 559-563; 356/401; 358/101, 107

[56] References Cited

U.S. PATENT DOCUMENTS

| | | | |
|---|---|---|---|
| 4,653,399 | 3/1987 | Kuehfuss | 83/74 X |
| 4,719,575 | 1/1988 | Gnuechtel | 364/469 |
| 4,768,410 | 9/1988 | Wood | 83/371 X |
| 4,781,090 | 11/1988 | Feldkamper et al. | 83/371 X |
| 4,809,188 | 2/1989 | Willits et al. | 364/469 |
| 4,951,223 | 8/1990 | Wales et al. | 101/486 |
| 5,131,301 | 7/1992 | Gergek | 83/365 X |

*Primary Examiner*—Joseph Ruggiero
*Attorney, Agent, or Firm*—Hill, Steadman & Simpson

[57] ABSTRACT

During, for example, package production, printed sheets are carried by gripper bars through a cutting station of a machine. Front waste strips are removed from the printed sheets and are carried to an ejection device, but before reaching the ejection device, a camera and flash scanning unit scans the area of the front waste strip which has been marked with color registration marks and also includes at least a portion of a cut edge. An image processing unit compares this sample image to a reference image to conduct a quality check on the precision of the printing and cutting registration.

13 Claims, 8 Drawing Sheets

METHOD AND APPARATUS FOR CHECKING PRINTING AND CUTTING QUALITY IN A PACKAGE PRODUCING INSTALLATION

BACKGROUND OF THE INVENTION

1. Field of the Invention

The present invention relates generally to a method and an apparatus for checking the printing and cutting quality of in a line of machines for processing web or sheet-shaped workpieces to be transformed, for example, into packages.

2. Description of the Related Art

In the production of packages, made of, for example, corrugated or non-corrugated board, at least three successive phases, for example, a printing phase, a cutting phase, and a folding and gluing phase. The quality of the final product depends upon the quality achieved during each individual processing phase.

Up to now, the checking of printing quality has typically been done visually after the printed product leaves a printing machine, such as a flexographic printing machine. The visual checking is done, for example, by a person who has received the necessary instructions concerning the requirements made of the printing quality and who, after considerable practice, has sufficient knowledge, experience, and know-how to judge the print quality after a quick glance at the multi-color print obtained by the various printing units of a machine. This person must then decide whether the print being examined is acceptable. If the print is acceptable, the person permits the printing machine to continue production with the printed products being forwarded to the subsequent cutting phase. If the printed product is not found acceptable, the operator of the printing machine will be so informed by the inspector and will control the printing machine to add modifications required to eliminate the deficiencies in the printed product. In this regard, it is possible that printing can be achieved on an endless web or on individual sheets traveling successively through the apparatus.

The quality of the cutting action of the machinery can also be checked essentially visually in the same way as the print quality checking. If, according to the operator or other qualified person, the distance between the edge of a blank and the beginning of the printed motif is kept within a predetermined value, the cutting machine is allowed to continue production with the products being forwarded, for example, to a folding and gluing phase. If the distances do not meet the predetermined value, the operator is to take the necessary measures to improve the position of the blank with regard to the printed motif.

The following drawbacks may be derived from the foregoing:

- Checking is not permanent;
- Checking can only be done by an experienced person;
- Checking is not reliable in that there is a considerable risk of an error in judgement due to the lack of objective criteria with regard to the printing and cutting quality, and this risk of error is likely to be enhanced by supervisor, or inspector fatigue;
- The supervisor, or inspector, does not have the means to easily gather statistical quality data by recording during the run the number of sheets which meet the printing or cutting quality criteria. In other words, the inspector cannot simply and simultaneously centralize the, for example, four main types of quality checks to be performed with regard to printing and cutting in a line of package producing machines; and
- Finally, such supervisory activity is monotonous, repetitive, and tiring.

SUMMARY OF THE INVENTION

The present invention generally concerns checking the printing and cutting quality of printing and cutting machines while doing away with the drawbacks set forth above.

This and other objects and advantages of the invention are achieved in a method for checking the printing and cutting quality of a line of machines which process a web or sheet-shaped workpieces that are to be transformed, for instance, into packages, during the course of which are read color registration marks printed on the workpieces by putting the marks in an area of the workpieces destined to be, after cutting, on a front waste strip of the sheet, the process being used to check for at least one of the following features, whether the sheet is inverted by 180°; whether all colors have been printed; whether registration error tolerances are met; and whether tolerances for cutting inaccuracies are met with regard to the printed motif. The invention is characterized by a camera and flash scanning unit that includes a camera with an illuminating device, and an image processing system which visualizes and memorizes in a first, so-called learning phase the registration marks and an adjacent area of the cut edge of a front waste strip that is considered as a reference model. In a second, so-called production phase, the registration marks and the adjacent area of the cut edge are of successive front waste strips resulting from the production are viewed and scanned by camera. The pattern of every such front waste strip is compared by image processing to the pattern of the reference model in a way to allow the positional variations of the color registration marks and the cut edge of every sample to be determined relative to the position of those of the reference model. This comparison is done with a view to checking whether, and indicating that, the positional variations are situated within a range of allowances, or tolerances, that are acceptable for positioning of the registration marks and the cut edge. The result of the comparison are entered into the data processing unit.

The objects and advantages of the invention are also achieved by an apparatus for performing the method of the invention including at a station preceding the removal station for the front waste strip, a camera-flash unit for scanning the color registration marks and the position of the cut edge; an image processing system connected to the control board of a machine control console; a monitor interface for communication with the operator, means for visualizing images, parameters and results in the form of various screens and a functional track ball or the like along with keys such as store, select, and stop keys.

For a better understanding of the invention, a description will be provided hereinafter of a way in which the invention may be realized, with reference being made to the attached drawings.

DESCRIPTION OF THE PREFERRED EMBODIMENTS

Figure 1:
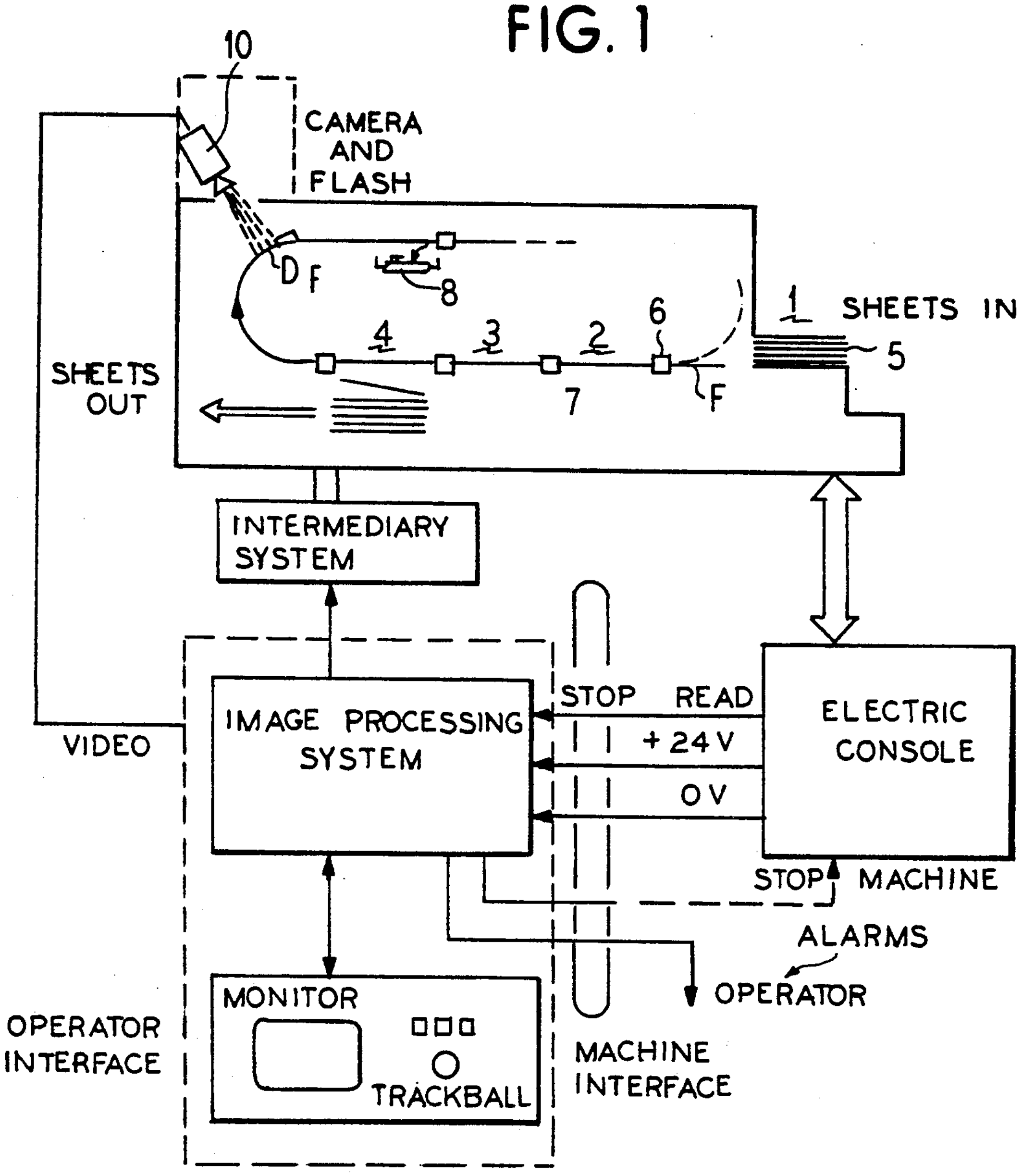
FIG. 1 is a general schematic view of a cutting machine including a block diagram of the main components used for checking the printing and cutting quality according to the present invention.

In FIG. 1 is shown schematically a machine having an infeed station 1 for sheets which have been printed, a cutting station 2, a waste stripping station 3, and a blank delivery station 4. In operation, a sheet F is seized from a pile 5 of the sheets and the front, or leading, edge of the sheet F is inserted into a gripper bar 6 which is moved by a pair of chains 7. The sheet F is carried through the various processing stations so that the sheet is cut at the cutting station 2, the waste strip Df is removed at station 3 and the blank is deposited at a blank output at the station 4. Following the delivery station 4, the front waste strip Df of the sheet F alone remains in the gripper bar 6. In the illustrated embodiment, the gripper bar 6 moves to an area on an overhead returnway for the chains 7 and the front waste strip Df is removed from the machine by an endless belt 8. Each of these operations is preferably accomplished when the gripper bars 6 are at a temporary standstill. Above and opposite one of the front waste strips Df at a stopping point of the gripper bars 6 after the delivery station 4 but prior to the stopping point for removal of the front waste strip Df from the gripper bars at the belt 8 is mounted a camera 10, preferably including a flash unit in conjunction therewith. The camera 10 generates a video signal of the image of the waste strip Df.

Figure 2:
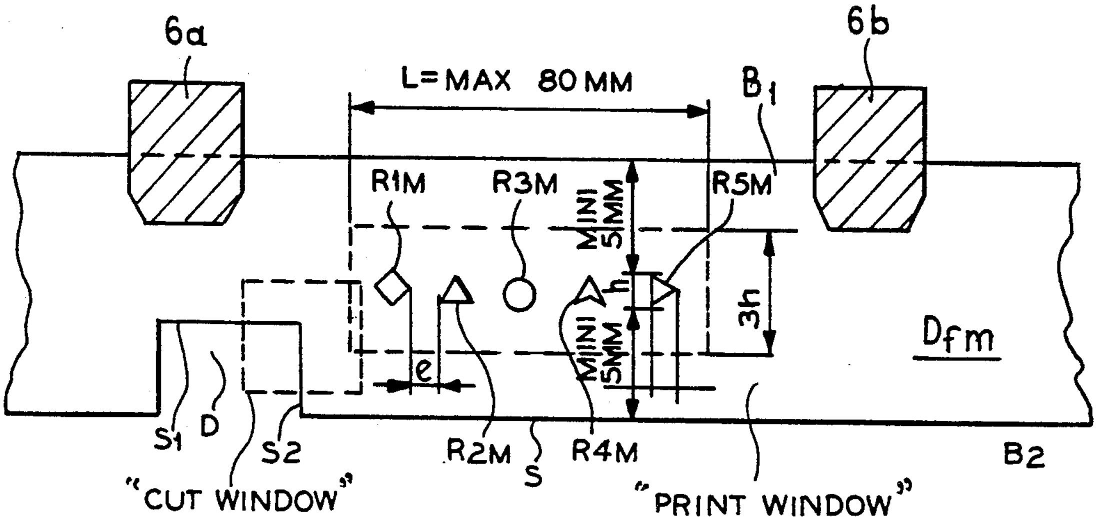
FIG. 2 is a partial plan view of a front waste strip held in grippers, the strip having been printed with color registration marks and cut off by a cutting machine.

A portion of the front waste strip Df is shown in FIG. 2 as visible in the field of the camera 10. At the stopping point for view by the camera, the waste strip Df is held in place by the grippers 6*a* of the gripper bar 6. The grippers 6*a* are engaged on an outermost front edge B1 of the waste strip Df, the front edge B1 being opposite an edge B2 formed by a separating or cutting line S which lies between the waste strip Df and the corresponding blank (not shown) from which the strip has been removed. In other words, the line S corresponds to the shape of the cutting rule of o the cutting press in the waste stripping phase 3. In the illustrate waste strip Df, the separating line S is not straight throughout its length, but instead also includes edge portions S1 and S2 which will be referred to as a cut D. In the immediate vicinity of the cut D, five successive color registration marks R1, R2, R3, R4 and R5 have been printed in a previous printing step. Each of the registration marks corresponds to one of five printing units of a flexography press, for example. Every one of the mark R1-R5 thus corresponds to a color which has been printed. Obviously, it is possible to use more or less than five registration marks depending upon the number of color printing steps being performed.

To render the camera 10 capable of scanning the color registration marks R1-R5 with sufficient precision, dependability, and rapidly, the following conditions should preferably be met:

- The registration marks R1-R5 should be aligned lengthwise on the center of the waste strip Df;
- Square and rectangular shapes are not permissible for use as the registration marks R1-R5;
- A minimum distance e of approximately 3 mm is required between the various marks R1-R5;
- The minimum distance between the various registration marks R1-R5 and the two lengthwise edges of the waste strip Df should be approximately 5 mm;
- Each one of the registration marks R1-R5 should have a height h and a width 1 in the range of approximately 3–6 mm;
- The arrangement of the five color registration marks R1–R5 relative to the cut D should be such that all of the marks as well as the cut will be located in a single field of vision covered by the camera 10;
- It is preferred that a background be provided in the area of the cut D which provides a sharp contrast at the cut edges to insure easy scanning by the camera 10; and
- The camera should be fitted so as to be shiftable in the lengthwise direction of the waste strip Df so that it can be positioned exactly opposite the color registration marks R1–R5 and the cut D. The camera preferably has a depth of field of approximately ±2 mm and a distance of approximately 350 mm relative to the workpiece to be scanned.

The purpose the camera 10 is, thus, to simultaneously scan the five color registration marks R1–R5 as well as the cut D when the waste strip Df is at a standstill. Each time the waste strip D is scanned, a photo-flash unit is flashed in synchronized control with the cutting machine. The light from the flash reduces to a minimum the ambient causes of error or inaccuracy in scanning such as, for example, the vibration of the waste strip Df in the running direction of the gripper chains 7. The light of the flash unit may be replaced by continuous illumination provided the camera 10 is set to an exposure of a very limited time.

As shown in FIG. 1, the scanning unit designated as CAMERA-FLASH operates in conjunction with a data processing unit including an IMAGE PROCESSING SYSTEM which receives the video signal and an OPERATOR INTERFACE for communication with an operator by means of a MONITOR and a small control panel provided with, for example, a TRACKBALL and function keys, such as a store key, a select key, and a stop key as well as some optional keys (not shown). As will be described hereinafter, messages for guiding the operator in the use of the system are visible on the screen area of the MONITOR. Although a TRACKBALL is used in the preferred embodiment, the TRACKBALL may be replaced by other means such as a mouse or joystick for communication between the machine and the operator.

The data processing unit is connected to a machine CONTROL CONSOLE through two supply lines of +24 V and 0 V, a read control line denoted STOP READ, and a so-called machine stop line denoted STOP MACHINE which allows the sheet infeed to be discontinued and/or the cutting press to be stopped. Also provided is a line connecting the IMAGE PROCESSING SYSTEM to an INTERMEDIARY SYS- TEM to allow control of the INTERMEDIARY SYSTEM if trouble is detected by the machine for easy sorting by the operator. Four of the five lines passed through a MACHINE INTERFACE which operates between the machine and the checking unit.

In a first, so-called learning phase of quality checking by the CAMERA AND FLASH scanning unit and the IMAGE PROCESSING SYSTEM, the registration marks R1m through R5m as well as the cut Dm of a front waste strip Dfm identified as a reference model which meets all quality criteria requested by the production is scanned and memorized, or recorded.

The front waste strip Dfm which bears the printed registration marks R1m through R5m and the cut Dm is chosen in the following way: from among the prints which are serially printed and run out from the printing press (which is not here shown although it is situated upstream of the cutting unit in a line of package producing machines) is chosen a standard sheet F which meets the print quality features by an experienced person. Moreover, a simultaneous check is made to reveal whether all of the five color registration marks R1 through R5 have actually been printed in the required area by the corresponding printing unit.

The standard sheet is then carried to the cutting machine shown in FIG. 1 where it travels through the successive stations 1 through 4. Once the first standard sheet has come to a standstill under the camera 10, the camera is positioned so that the target area which includes the five registrations marks R1m–R5m as well as the cut Dm of the reference waste strip Dfm is positioned in the visual field of the camera 10.

Figure 7:
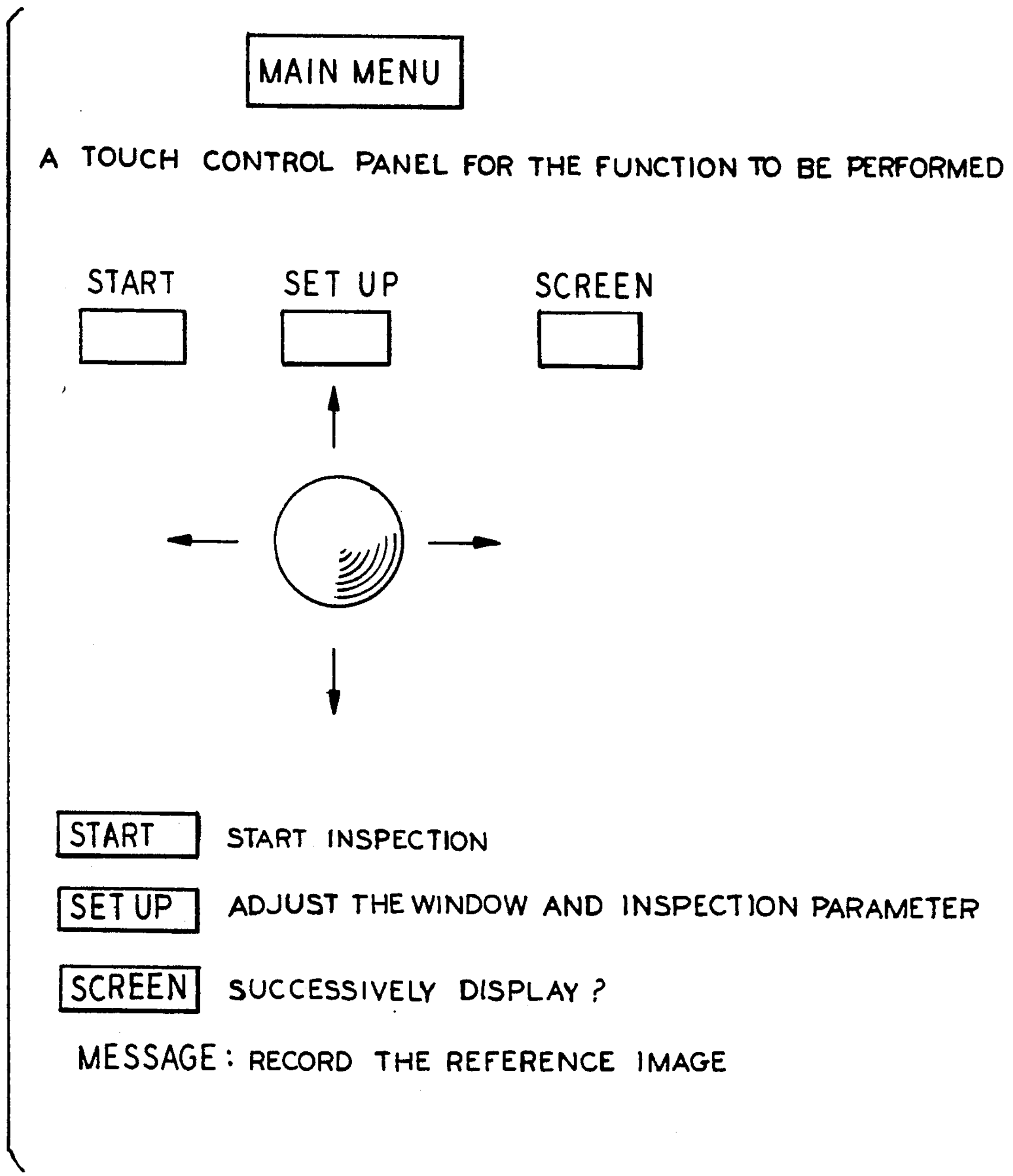
FIG. 7 is an illustration of the content of a main menu screen appearing on the viewing monitor of the operator interface apparatus of FIG. 1 for viewing by the operator of the process and also showing operator steps which may be performed while viewing the screen.

For easy adjustment of the scanning action during the learning phase as well as for subsequent phases operating adjustments and controls, various screens of information are shown on the MONITOR corresponding to the phase to be performed. A MAIN MENU as shown in FIG. 7 provides access to the sub-menu for performing the various functions, shown in FIGS. 8, 9, 10 and 11. The submenus are selectively called up from the MAIN MENU screen by function keys, for example, the keys labeled START, SET UP and SCREEN. Moreover, the visual field of the camera 10 is visible as an active image on the screen of the checking unit to aid in locating the reference waste strip within this field. When the system is being installed, appropriate focusing of the camera 10 on the waste strip Dfm is also performed to contribute to locating of the target.

The MAIN MENU screen is shown in FIG. 7 as a touch control panel including a representation of the function keys START, SET UP, and SCREEN as well as an explanation of each of the keys and a representation of the TRACKBALL. The learning phase is initiated by actuation of the SET UP key.

Figure 8:
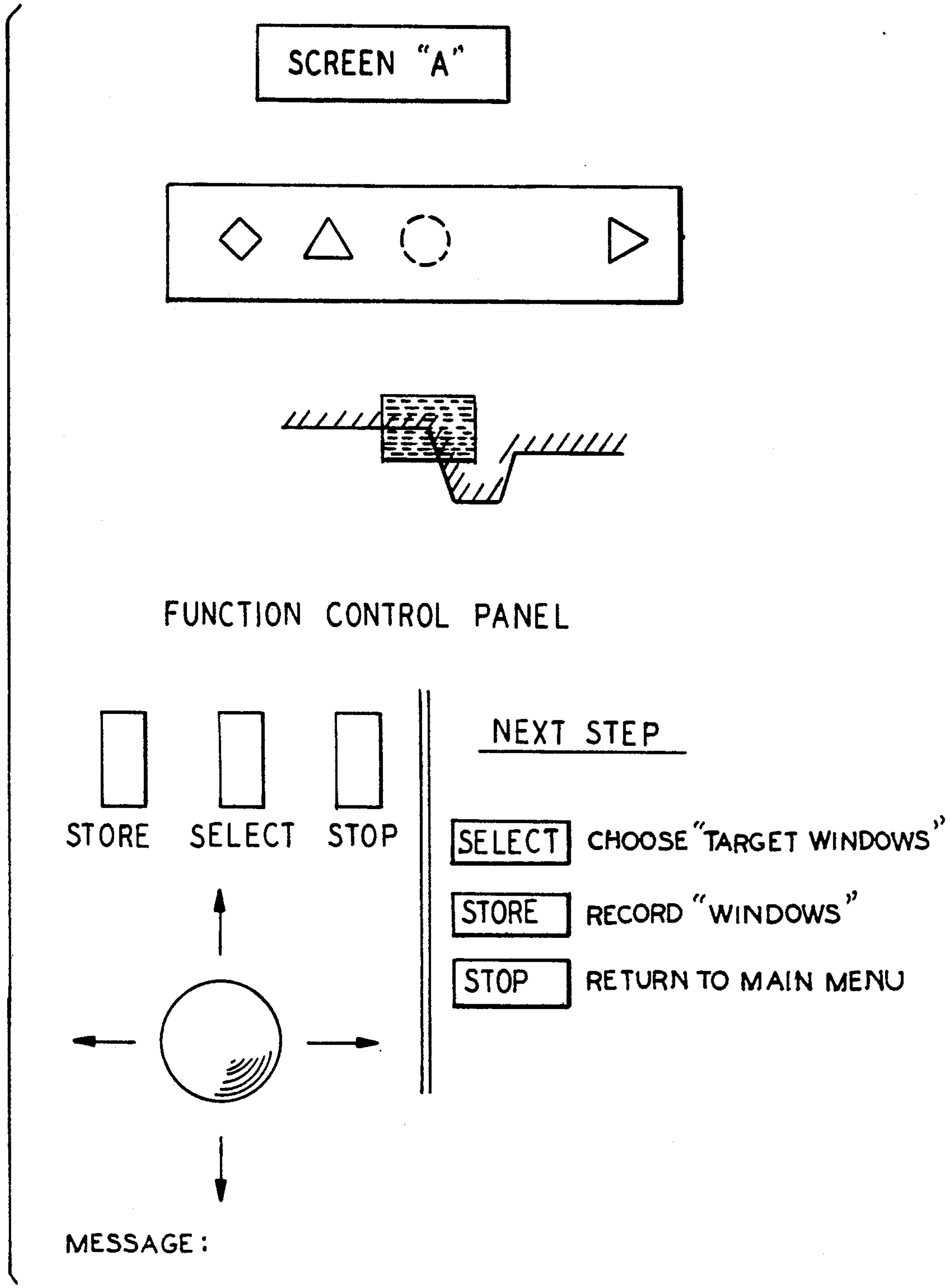
FIGS. 8 through 11 show the contents of further screens for viewing by the operator in subsequent operational stages according to the invention.

In the course of the first, learning phase the operator or some other qualified person is able to check visually a SCREEN "A" shown in FIG. 8 to determine whether the cut Dm is actually positioned according to the conditions required with respect to one of the registration marks R1m through R5m. In the event of mispositioning, a sideways shift of the CAMERA AND FLASH scanning unit is performed so that the print and cut marks are positioned within the visual field of the camera.

Considering that, as will be seen later, the quality checking process involves comparison of the positions of the registration marks R1m through R5m and of the cut edge Dm of the reference waste strip Dfm with the position of the color registration marks R1 through R5 and the cut edge D of a sample waste strip Df as results from the machine operation, the checking unit is required to insure for the calculation and recording that the position of both the registration marks R1m through R5m and the cut edge Dm appear within the visual field of the camera. To this aim, the checking unit is equipped with means to enable the opening in the visual field of two initial spaces or windows within which there are more chances to find the marks R1m through R5m or the cut Dm. The procedure used for detection and measuring of the position by means of a window is relatively well known in connection with image processing, to which reference can be made for more details since the present quality checking process largely uses these features.

In this way, the checking unit, with the reference marks R1m through R5m and the cut Dm visible on the SCREEN "A" and with the help of the TRACKBALL to allow positioning, shifting, centering and dimensioning of a first initial window referred to as a PRINT WINDOW centered on the five registration marks R1m through R5m and of a second so-called CUT WINDOW relating to the cut edge Dm. Attention is directed to the fact that the windows are for the purpose of limiting both the visual field for recording the reference patterns, in other words the shape and position of the marks and the cut, in the course of the automatic learning phase of the machine, and of the number of patterns likely to be taken into consideration. In fact, the front waste strip Dfm light contain spots which could be erroneously considered as patterns. Such errors might be caused by the gripper bars 6*a*. In other words, when the image is processed, the PRINT WINDOW and the CUT WINDOW will inform the IMAGE PROCESSING SYSTEM of the area of the visual field that the checking unit is to search for the target (the registration marks R1m through R5m or the cut Dm) so as to reduce the risk of errors caused by mistaking a similar spot situated in the visual field of the camera.

As may be gathered from the above-mentioned comments about image processing, evidence is also given for which reason the cut edge Dm is considered in a characteristic area with a lateral cut S1 and a lengthwise cut S2. In fact, such a cut Dm made up of two cut edges S1 and S2 meeting at an angle of, for example, 90° is detectable and measurable at a higher speed, precision and dependability than a cut line S which is a single straight line.

As may be deduced from FIG. 2, no particular difficulties are expected from the choice and the use of two windows, namely a PRINT WINDOW and a CUT WINDOW on account of the fact that the CUT WINDOW may be easily centered about the cut edge Dm since the CUT WINDOW is still of sufficient dimensions although it encloses no registration marks R1m through R5m. The same applies to the PRINT WINDOW which is to be sufficiently large for enclosing all of the registration marks R1m through R5m. It may be added that the windows are positioned by default although their dimensions may be changed if required.

In the learning stage screen shown in FIG. 8, the STORE key records the image of the reference target with a checking unit for calculating and memorizing the position of every one of the registration marks R1m through R5m and the cut edge D of the reference waste strip Dfm.

To subsequently compare the reference waste strip Dfm to a production sample waste strip Df as mentioned above, it is required during the learning phase of the checking process to enter the criteria for each feature checked by the checking unit, which is done in conjunction with SCREEN B1 shown in FIG. 9.

The present quality check covers essentially four features, namely:

- The presence of all colors (of which there are five in this example);
- The positioning of the five colors to ensure the lengthwise and crosswise registration accuracy with a maximum allowance of, for example, ±5 to 10 mm;
- Alignment of the sheet to insure that the sheet is not turned by 180°; and
- The position of the sheet within the gripper bar 6 with reference to the x and y axes with a 1 mm allowance for the cut position.

In connection with checking the four features set out in the foregoing, the following performance requirements are desired:

- An evaluation speed of 8,000 sheets per hour;
- The dimensional tolerances acceptable in the course of production being, for example ±5 mm in both the x and y direction are to be accepted by the system with the variation of the target position;
- The scanning precision is to be five times smaller than the minimum allowance of the color position, in other words 0.1 mm;
- Recognition and identification of registration errors are to be automatic; and
- The initialization for checking is to be automatic so that the operator's assistance is kept to a mere minimum.

Figure 9:
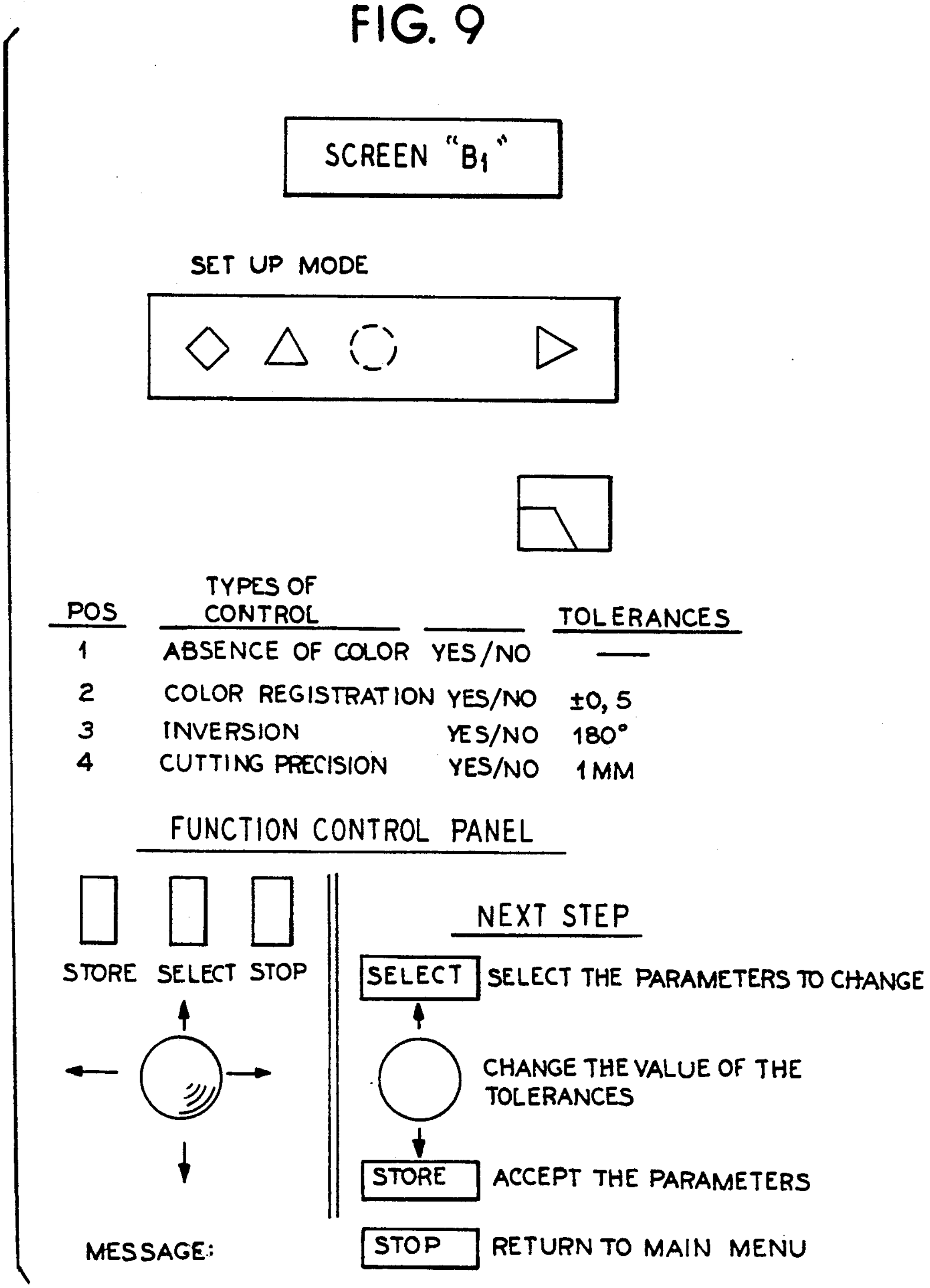

On the SCREEN "B1" shown in FIG. 9, a display on the monitor shows how the key permits choosing o parameter to be entered, modifying the parameter by scrolling the trackball, recording the parameter by means of the STORE key and, finally, return to the MAIN MENU by actuating the STOP key.

Figure 3:
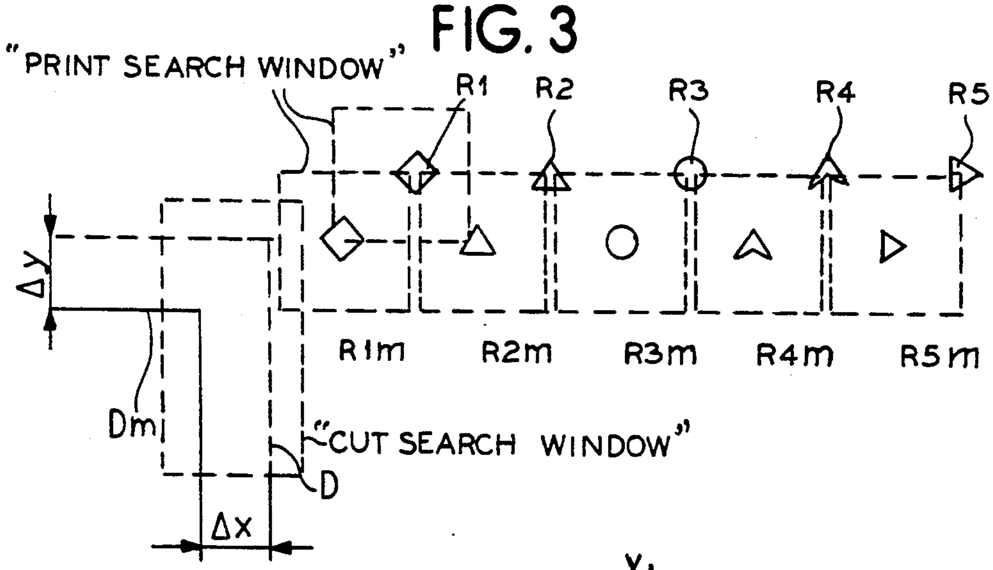
FIG. 3 is a schematic view of color registration marks in changed positions.

In the course of the learning phase, the system also determines six search windows, five of which are so-called PRINT SEARCH WINDOWS with each being attributed to one of the registration marks R1m through R5m and the sixth being a so-called CUT SEARCH WINDOW, as shown in FIG. 3. For reasons of clarity, a magnified view of the cut edge Dm and of the five registration marks R1m through R5m on the reference waste strip Dfm are shown. The CUT SEARCH WINDOW is represented as centered on the reference cut edge Dm, and the print search windows are represented on each of the registration marks R1m through R5m.

These search windows also shorten the time required for the detection and calculation of the position of each of the target components so that the checking unit will be able to accomplish its function at machine speed, in other words at an investigation speed of approximately 8,000 sheets per hour.

When locating the search windows for their respective task, certain precautions are to be taken so that, for example, the cut edge Dm will not coincide with the PRINT SEARCH WINDOW related to the registration mark R1m or, inversely, that the first registration mark R1m will not coincide with the CUT SEARCH WINDOW, or that any one of the registration marks R1m through R5m will not coincide with the PRINT SEARCH WINDOW of an adjacent mark. To fulfill these conditions, a PRINT SEARCH WINDOW can be calculated, for instance, in the following way:

d=The distance between two adjacent registration marks, such as, R1m and R2m of, for example, 6 mm.

t=The tolerance between the print and the cut adopted by the operator in the course of the SET UP, of for example 1 mm.

l=The dimensions of a mark, of for example 4 mm.

x=y=The dimension of the print search window related to the mark R1m.

The formula for calculating the first PRINT SEARCH WINDOW of the mark R1 is:

$$X1=d+2t+1\ (=6+2X\ 1+4=12\text{ mm}).$$

The formula for the subsequent PRINT SEARCH WINDOWS is:

$$xn=2d+1\ (=2x6+4=16\ mm).$$

In this connection, a compromise is to be adopted between a rather small window which is unable to provide sufficient tolerance for print variations and a rather large window which would unnecessarily increase the search time.

Figure 4:
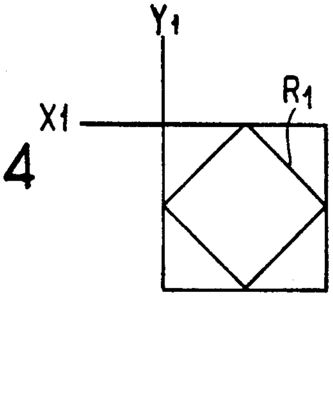
FIG. 4 is a single color registration mark.
Figure 5:
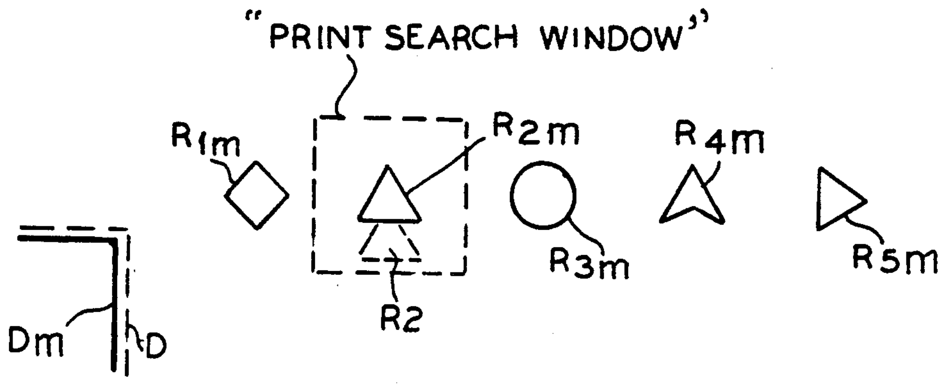
FIG. 5 and 6 are further schematic views of different color registration mark positions.

With the six search windows recorded, the checking operation is achieved in the following stages:

1) Recording of the sample image of all front waste strips Df traveling in the course of production.
2) Searching the position of the cut edge D and the CUT SEARCH WINDOW. The comparison of this position with the reference cut edge Dm recorded during the learning phase allows the positional variation (Δx and Δy to be calculated along the x and y axes, as shown in FIG. 3).
3) Correction of the position of the print search windows in accordance with the same variations along the x and y axes.
4) Search for the existence of and the position of the color registration mark R1 by comparison between the sample mark R1 and the reference mark R1m within the PRINT SEARCH WINDOW. As shown in FIG. 4, the result will indicate the position x1 and y1 of the mark R1 within which the shape score is highest between the reference mark R1m and the sample mark R1. This search is also performed for the other four marks resulting in dimensions x2 and y2; x3 and y3; x4 and y4; and x5 and y5.
5) Check whether a 180° inversion of the sheet has taken place, and especially whether at least one of the color registration marks R1 through R5 can be found.
6) Check whether all colors are present and especially whether the number of marks R1 through R5 found is equal to the number of the reference marks R1m through R5m, which are five such marks in the present example.
7) Check whether the color registration error conditions are met. For this check, the illustration in FIG. 3 shows a case where these conditions are met, and where only the reproducible mispositioning of the waste strip Df becomes effective in the visual field of the camera, the mispositioning being due to the machine, in other words due to the varying position of the gripper bar. In this instance, the color registration conditions are fulfilled. FIG. 5 shows an example without reproducible mispositioning but with a registration error of the second mark R2. Owing to the PRINT SEARCH WINDOW for the second mark R2m, it is possible to calculate the distance between the position of the second mark R2 and the position of the reference mark R2m. Without considering the reproducible mispositioning, this distance will be designated X2 and Y2. An identical calculation is effected for all color registration marks R1-R5 so that the following summation applies:

Xm max. positive |+| Xn max. negative |}−operator allowance

}|Yn max. positive |+| Yn max. negative |)−operator allowance

These permit a conclusion to be drawn as to whether there is any registration error.

8) Check whether the conditions concerning the cutting precision are fulfilled. These conditions are checked by calculating the average rate of registration error, where n is actually the number of marks $$ex = \Sigma ex / n + \Sigma Xn / n$$

$$ey = \Sigma ex / n + \Sigma Yn / n$$

Thereafter, if after subtraction of the initial mispositioning x and y relating to the cut D and of the operator allowance from the rates ex and ey, the result is other than 0, this means that the cut positioning conditions with respect to the print position are not met.

Figure 6:
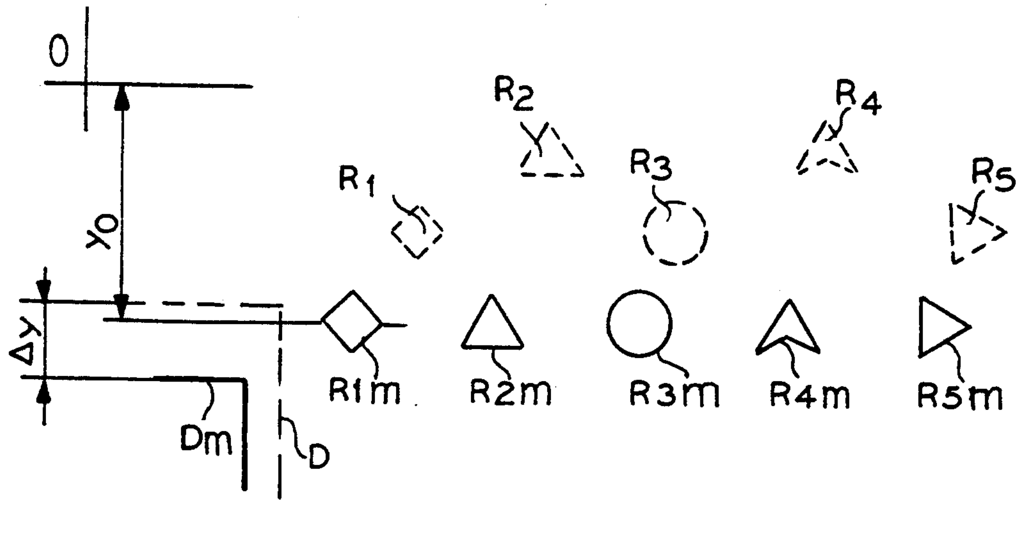

In this regard, FIG. 6 shows an example in which the marks R2 and R4 are actually displaced from their maximum rate with regard to the other marks R1, R3, and R5. The displacement is equal to 2 mm with the result that $$ey = (2+2) / 5 = 0.8 \text{ mm}$$

In this way, four checking features desired on every front waste strip Df travelling past the camera 10 are carried out.

All parameters and results of the checks are displayed on the SCREEN "B1" shown in FIG. 9.

Figure 10:
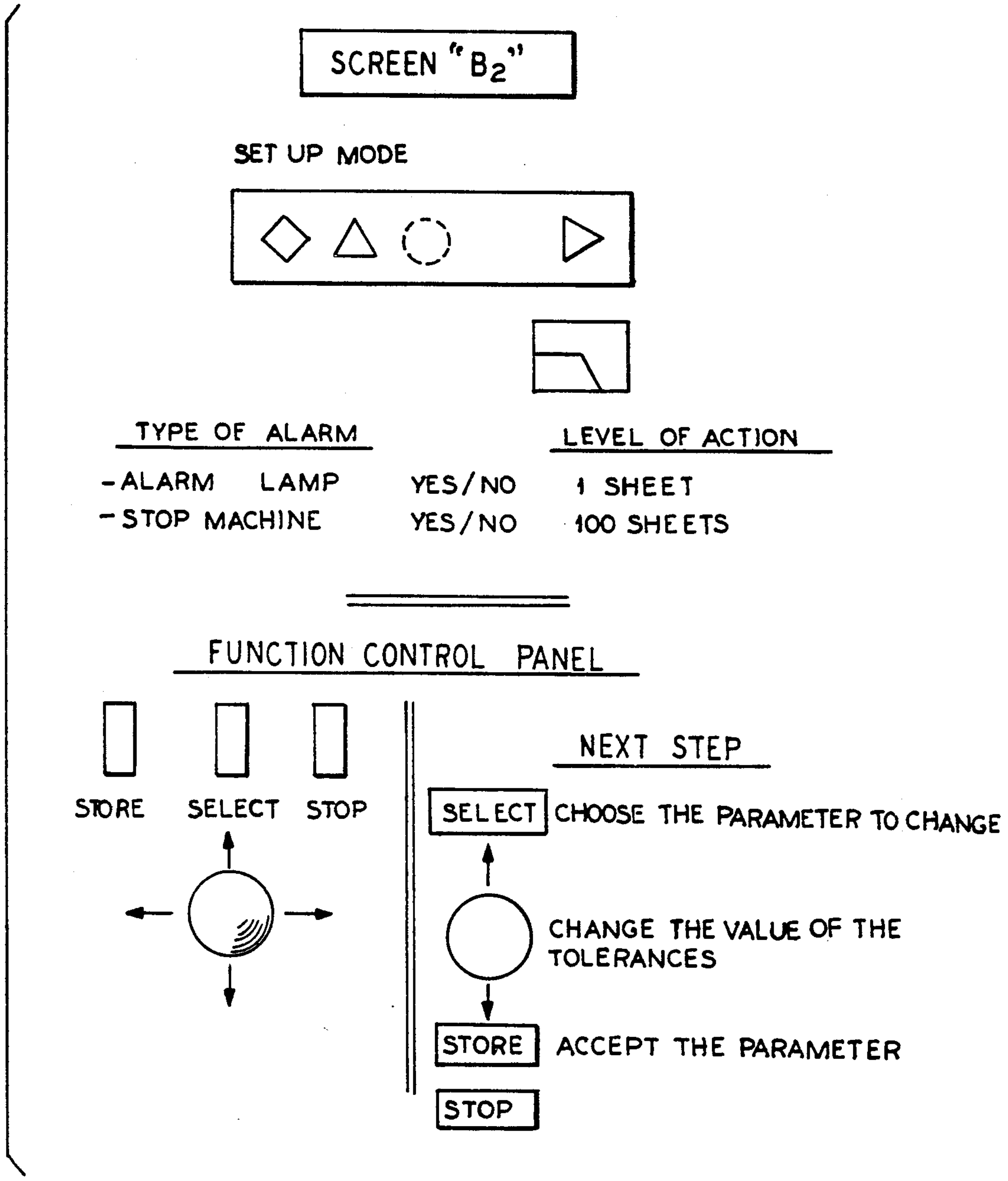
Figure 11:
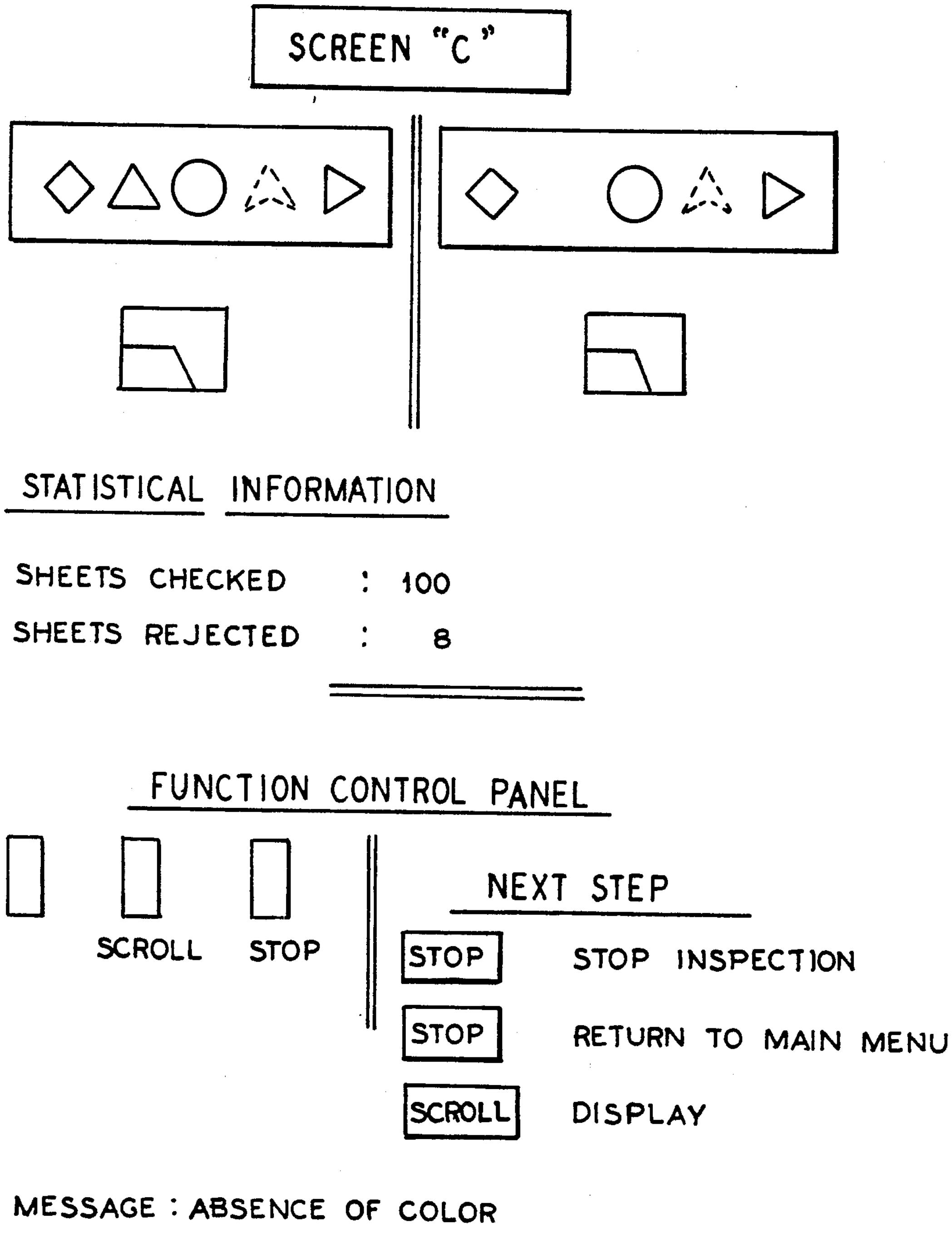

The checking unit is also used for keeping a statistical record of all main results, as shown in FIG. 11, for defining the instant at which, for instance, a visual or acoustic warning signal is to be omitted for the operator, as shown in FIG. 10.

The SCREEN "A" as shown in FIG. 8 includes an active image showing the registration marks and the cut edge of a sample.

The SCREEN "B1" shown in FIG. 9 displays the parameters and the results of every check.

The SCREEN "B2" shown in FIG. 10 relates to the warning action to be taken.

The SCREEN "C" shown in FIG. 11 shows the marks and the cut edge of a sample waste strip simultaneously with the marks and the cut edge of the reference waste strip.

In the SCREEN "B1" of FIG. 9, it may be added that: the registration error rates are shown by inverse video, a scrolling allowance is insured between ±0.3 to 2 mm (in steps of 0.1 mm) for color registration and from 0.5 to 10 mm (in steps of 0.1 mm) for cutting precision.

With regard to the SCREEN "B2" of FIG. 10, scrolling of the level rates for actuating the warning system are instructing the machine to stop will take place between 1 and 200 in steps of unit.

Owing to the presence of the TRACKBALL, the rates and allowances may be changed, though only after actuating the SELECT key.

Owing to the presence of the SCREEN key, it is possible to successively call up the screens "B1", "B2", as well as the available statistical data.

As an optional feature, it is possible to have the camera 10 shifted crosswise by means of a servo motor controlled through a special key on the panel.

The data processing unit is capable of keeping in a non-volatile memory the data of the last parameters used for defining the program, as well as those of the windows. These parameters will be the default rates used when the system is again powered up.

Moreover, it is possible to set up a control relationship between the checking unit described above and the positioning control for the front lays of the feeder table in the cutting press infeed station 1, or else for the cylinders of every printing unit of a printing machine.

In the course of a production run, the process described above is also capable of providing a warning and/or alarm signal after a predetermined number of sheets have been detected with registration errors beyond the allowances. These signals can be used for warning the operator optically or acoustically, by acting directly on the machine to stop production, or by marking the waste strip Df by ink or similar means, or by actuating an automatic waste ejection device.

As may be gathered from the foregoing description, the present invention enables:

- automatic supervision which is more reliable, more rigorous, and more frequent;
- a 100% on-line checking capability to take action as soon as registration errors appear;
- a quality level to be maintained; and
- a higher profitability of the machine since fewer operators are required.

Although other modifications and changes may be suggested by those skilled in the art, it is the intention of the inventors to embody within the patent warranted hereon all changes and modifications as reasonably and properly come within the scope of their contribution to the art.

I claim:

1. A method for checking printing and cutting quality of machinery for processing web or sheet shaped workpieces on which has been printed registration marks, comprising the steps of:

cutting a waste strip containing the registration marks from the web or sheet;

scanning the waste strip with a scanning unit and an image processing system for the registration marks and a cut edge;

recording a pattern of registration marks and a cut edge on a waste strip as a reference model in a learning phase;

scanning a subsequent waste strip with said scanning unit and said image processing system in a production phase;

comparing a pattern of the registration marks and the cut edge on sad subsequent waste strip to said reference model to determine positional variations of the registration marks and the cut edge of said subsequent waste strip relative to said reference model; and checking whether sad positional variations are within a predetermined range of tolerances.

2. A method as claimed in claim 1, wherein said step of checking checks for at least one condition, wherein said at least one condition is at least one condition chosen from the group consisting of: the web or sheet is not inverted, all colors have been printed, registration error tolerances are met, and cutting tolerances relative to a printed motif are met.

3. A method as claimed in claim 1, wherein said step of scanning comprises:

using a camera with an illuminating flash as said scanning unit.

4. A method as claimed in claim 1, further comprising the step of:

indicating whether said positional variations are within said predetermined range of tolerances.

5. A method as claimed in claim 1, wherein said first scanning step and said recording step use two windows in said image processing system during said learning phase, a first of said two windows being a print window centered on the registration marks and a second of said two windows being a cut window centered on a cut edge of said reference model waste strip; and wherein said second scanning step and said comparing step uses said two windows in said image processing system during said production phase.

6. A method as claimed in claim 1, wherein said second scanning step and subsequent steps are repeated for a plurality of waste strips; and further comprising the step of:

establishing a statistical account of results from said checking steps for a plurality of waste strips in said production phase by a data processing unit.

7. A method as claimed in claim 6, further comprising the steps of:

conducting a trend determining calculation from said statistical account; and controlling operation of the machinery depending on the outcome of said trend determining calculation.

8. A method as claimed in claim 7, wherein said step of controlling controls a gripper bar for positioning a sheet.

9. A method as claimed in claim 1, further comprising the step of:

transmitting a feedback command to he machinery to at least reduce print registration errors, said feedback command being based on a result of said checking step.

10. A method as claimed in claim 1, wherein said second scanning step and subsequent steps are repeated for a plurality of waste strips; and further comprising the steps of:

monitoring a predetermined number of said waste strips for registration error rates beyond acceptable tolerances; and emitting a warning signal when said predetermined number of waste strips are found to be beyond said acceptable tolerances.

11. A method as claimed in claim 10, wherein said warning signal is transmitted directly to said machinery to stop said machinery and further comprising the step of:

marking one of said predetermined number of waste strips upon transmitting of said warning signal.

12. A method as claimed in claim 10, further comprising the step of:

automatically ejecting sheets upon transmitting of said warning signal.

13. An apparatus for checking printing and cutting quality on a worksheet, comprising:

printing means for printing registration marks on a worksheet;

cutting means for removing a waste strip containing the registration marks from a printed sheet portion of the worksheet;

sheet moving means for moving the waste strip along a first path and for moving the printed sheet portion of the worksheet along a second path;

a camera means for scanning the waste strip for the registration marks and a cut location, said camera means being mounted adjacent the first path after said means for removing;

an image processing means connected to an output of said camera means for processing an image from said camera means; and a monitor interface connected to said image processing means, said monitor interface including control means for controlling functions of said image processing means and means for viewing images scanned by said camera means and for viewing parameters and results of functions controlled by said control means.

* * * * *